United States Patent
McKinnon

[15] 3,688,791
[45] Sept. 5, 1972

[54] SIPHON SYSTEM
[72] Inventor: Philip R. McKinnon, 6224 Deveron Drive, Charlotte, N.C. 28211
[22] Filed: May 3, 1971
[21] Appl. No.: 139,368

[52] U.S. Cl..................................137/135, 137/137
[51] Int. Cl...............................................E04f 10/00
[58] Field of Search......................137/135, 137, 151

[56] References Cited
UNITED STATES PATENTS
2,878,824  3/1959  Swanson.................137/135 X Primary Examiner—Henry T. Klinksiek
Attorney—Channing L. Richards, Dalbert U. Shefte, Francis M. Pinckney and Richards & Shefte

[57] ABSTRACT

An automatically primed continuously operating siphon system including a tank for collecting a liquid therein, the tank having an upper inlet and a lower outlet communicating with a siphon discharge conduit leading therefrom. The tank inlet and outlet each have associated therewith a float operated valve arranged so that during automatic priming of the system the outlet is opened and the inlet is closed to seal the upper portion of the tank in response to a rise in the level of the liquid in the tank. After the tank is sealed a pressure head is established by introducing a pressurized fluid into the sealed tank to thereby force the liquid through the outlet to establish a siphoning flow therein. As the level of the liquid falls as a result of the siphoning flow, the tank inlet is reopened to allow flow therethrough to the siphon, and the introduction of the pressurized fluid is stopped. The tank outlet will open and close in response to the liquid level in the tank to maintain a supply of water in the siphon discharge conduit and permit periodic siphoning of the liquid as it collects in the tank. In addition, safety features may be included to break any suction that may develop due to rapid siphon flow prior to opening of the inlet valve, to shut off the flow of pressurized fluid when the liquid level in the tank is abnormally high, to vent the tank, and to stop further flow of the liquid to the tank.

16 Claims, 2 Drawing Figures

SIPHON SYSTEM

BACKGROUND OF THE INVENTION

The problem of satisfactorily removing a liquid such as water from a collecting tank where a simple gravity drain cannot be used is frequently encountered. The most obvious solution to this problem is simply to provide a transfer pump with appropriate conduits and controls, but such pumping systems involve expensive and relatively complex arrangements requiring a power supply and frequent maintenance.

To offset these disadvantages of a pumping system, collected material siphon systems are sometimes used. However, siphon systems also present a problem in that the siphoning conduit must be maintained in a primed condition, or at least must be provided with means for priming a siphoning conduit when it is to be used.

One method of attacking this priming problem is to provide manual priming at the uppermost point of the siphoning conduit, and to provide a level responsive valve at the inlet of the siphoning conduit to close the inlet and maintain the siphon in a primed condition when the level of the material at the inlet of the siphoning conduit approaches a predetermined low level. Representative disclosures of this type of siphoning system may be found in U. S. Pat. Nos. 301,391 and 476,043. Manual priming is, of course, an obviously troublesome disadvantage, and even when level controlled inlet valves are employed in the siphoning system, the system must still be frequently primed because the air entrained in the water in the siphoning conduit will collect at the top of the siphoning conduit, thereby causing cavitation and loss of prime when the system remains static for even moderate lengths of time.

Some efforts have been made to overcome the need of manually priming the siphoning system as shown in U. S. Pat. No. 831,817 where a float operated pump is employed to force water into the siphoning conduit; however, this system involves a rather complex assembly of operating parts, including a moving piston, which detracts from the cost and reliability of the system, and any leakage around the piston or any loss of sealing otherwise will cause failure of the system to operate.

SUMMARY OF THE INVENTION

In accordance with the present invention, an automatically primed continuously operating siphon system is provided which is extremely reliable and which requires only a series of float operated valves used with a supply of pressurized fluid that is generally readily available at the point of employment.

The siphon system of the present invention includes a collecting tank having an upper inlet through which a liquid is admitted to the tank and a lower outlet communicating with a siphon discharge conduit leading therefrom. First control means, preferably a float controlled valve, is employed to open and close the tank outlet in response to the rise and fall, respectively, of the liquid in the tank, above and below a first predetermined level; and a second control means, also preferably a float controlled valve, is employed to close and open the tank inlet in response to the rise and fall, respectively, of liquid in the tank above and below a second, higher, predetermined level. Additional means are provided for establishing a pressure head in the tank after the tank inlet is closed, and this pressure head has sufficient magnitude to cause the liquid to be discharged through the siphon discharge conduit whereby a siphoning flow is produced therein.

In one embodiment of the present invention, the siphon system is designed to be used for collecting and discharging condensate generated by an air conditioning system or by a flush-type dehumidifying system or any other water handling or generating equipment. Since the collected liquid is water, the siphoning system utilizes conveniently available water from the main household or commercial water line as a source of pressurized fluid. A conduit from the main water line is led into the collecting tank, and this conduit is opened and closed by a float operated valve. In addition, this embodiment of the present invention may include a reservoir section located adjacent and above the upper portion of the tank and communicating with the tank through the inlet thereof, and a cut-off control device is arranged in the reservoir section to stop operation of the related equipment and to stop further flow of the pressurized water when the collected water reaches a predetermined level in the reservoir system as a result of a malfunction of the siphon system. Additionally, the collecting tank may be provided with a normally closed vent conduit extending through the top wall thereof, with a normally closed valve that is openable to break any siphon preventing vacuum that might prevent establishment of a siphoning condition and also is openable when there is an abnormal rise in the level of the collected water, whereby any pressure in the tank will be relieved through the vent conduit. Finally, magnets or similar delay-action controls are attached to the float element operating the tank outlet valve and to the base of the tank, and these magnets are arranged to provide a delay-action opening and a snap-action closing of the tank outlet valve to assure siphon flow only at a high flow rate and thereby reduce the tendency of entrained air to collect in the siphon discharge conduit as often occurs in siphon systems during periods of slow flow.

A second disclosed embodiment of the present invention is designed particularly for use with chemical liquids which are not compatible with water. This second embodiment is similar to the first embodiment described above except that the pressurized fluid is an inert gas, and the control for admitting the gas into the tank is controlled in relation to closing of the inlet valve to admit the gas into the tank only after the level of the collected liquid rises above the point at which the tank inlet is closed. In this way, the gas, when admitted, will be contained in the sealed portion of the tank above the level of contained liquid.

DESCRIPTION OF THE PREFERRED EMBODIMENT

Figure 1:
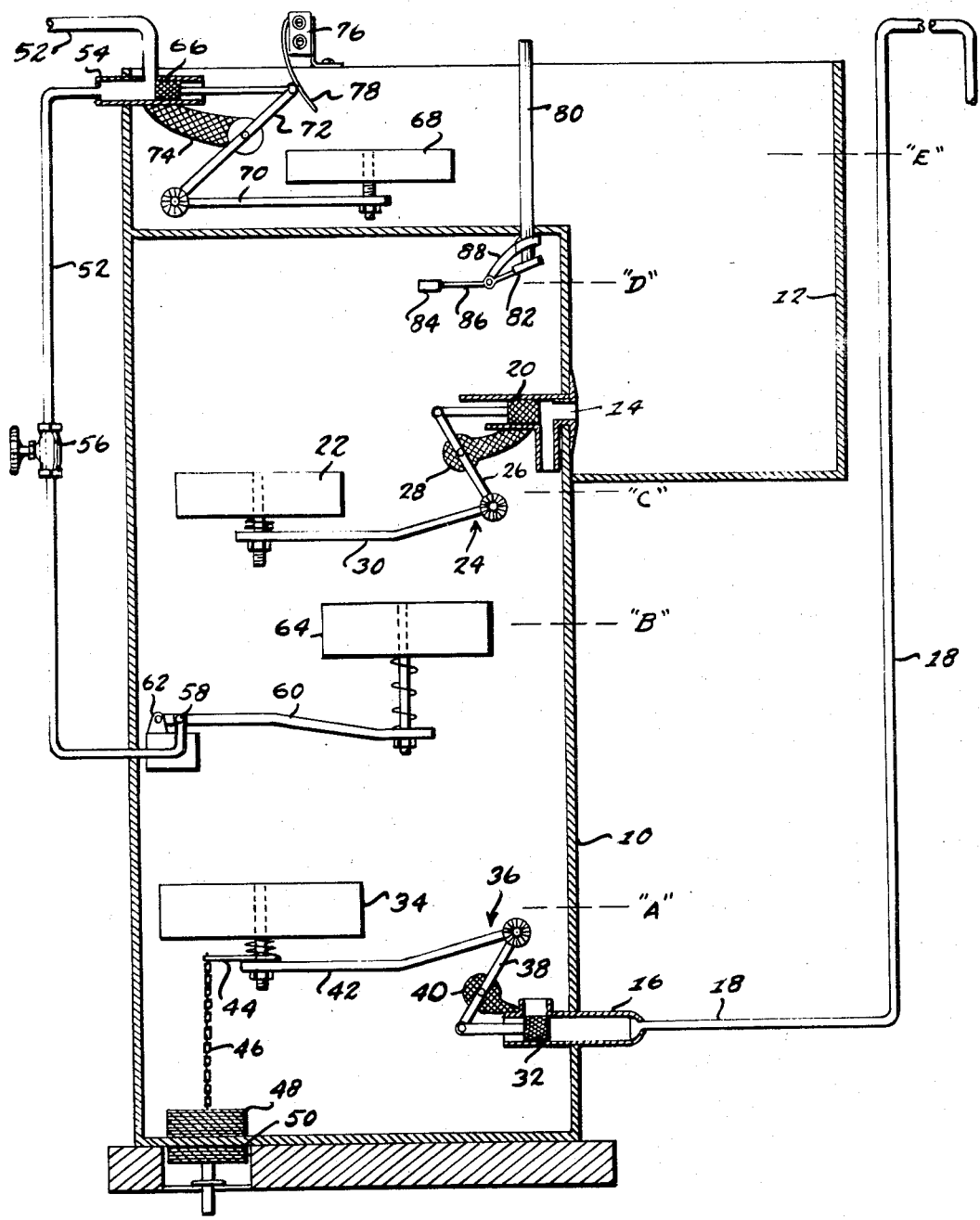
FIG. 1 is a diagrammatic illustration of one embodiment of the siphon system of the present invention.

Looking now in greater detail at the accompanying drawings, FIG. 1 illustrates a collecting tank 10 having a reservoir section 12 located adjacent and above the upper portion of the tank 10 with the lower part of the reservoir section 12 communicating with the interior of the tank 10 through a tank inlet 14 in the upper part of the tank. The lower part of the tank 10 includes an outlet 16 by which the interior of the tank 10 communicates with a siphon discharge conduit 18 leading therefrom. The siphon conduit 18 is only diagrammatically shown in FIGS. 1 and 2, and it is to be understood that the siphon conduit 18 may follow substantially any path in leading to a convenient point at which the collected material is to be transferred, subject only to the obvious requirement that the discharge end of the siphon conduit 18 be located at an elevation beneath that of the tank outlet 16.

Within the tank 10 and adjacent the tank inlet 14 is disposed a reciprocating piston valve 20 operated by a float element 22 through a linkage 24 including a pivot link 26 pivotally carried by a support 28, the pivot link 26 being pivotally connected to the piston valve 20 and being fixed to a connecting link 30 threadably receiving the float element 22. Likewise, a reciprocating piston valve 32 is disposed adjacent the tank outlet 16 and it is operated by a float element 34 through a linkage 36 including a pivot link 38 pivotally carried on a support 40 and pivotally connected at one end to the piston valve 32 and fixed at its other end to a connecting link 42 which threadably carries the float element 34. The float element 34 has an arm 44 extending therefrom to which is connected a depending bead chain 46 having a suitable magnet element, such as a permanent magnet 48, secured thereto, and a corresponding permanent magnet 50 is mounted in a cavity in the base of the tank 10 beneath the bottom wall thereof.

In the FIG. 1 embodiment of the present invention, a conduit 52 for supplying pressurized liquid extends into the tank 10 at a point between the level of the inlet 14 and the level of the outlet 16. Preferably, this supply conduit 52 leads from an existing water line in the building in which the siphon system of the present invention is situated so that a source of pressurized liquid is quite readily available at substantially any residential or commercial location. However, it is to be understood that any source of pressurized liquid could be used for the supply conduit 52 so long as the pressure of the liquid is of a sufficient magnitude as will be discussed hereinafter below. The supply conduit 52 is formed with a connection 54, and includes an in-line flow regulating valve 56 that is manually adjustable to control the flow rate of the pressurized liquid in the supply conduit 52. The end of the supply conduit 52 within the tank 10 is associated with a valve 58 formed as part of the lever 60 pivotally connected at one end to a fixed support 62 and threadably connected at its other end to a float element 64.

At the connection 54 of supply conduit 52 is disposed a piston valve 66 operated by a float element 68 located in the reservoir section 12 above the tank inlet 14, the float element 68 being connected to the valve 66 through a connecting link 70 fixed to a pivot link 72 that is pivotally carried by a support 74 and is pivotally connected to a piston valve 66. Also, a cut-off switch 76 is controlled by an operator 78 associated with pivot link 72 to cut-off the condensate generating equipment (not shown) when the liquid level in the tank 10 rises above a predetermined level as will be explained hereinafter below.

A vacuum breaking and pressure releasing vent conduit 80 extends into the upper portion of the tank 10 to a position well above the tank inlet 14, and a valve 82 is disposed at the end of the safety vent conduit 80 under the control of a weighted float element 84 mounted at the end of a link 86 pivotally carried by a support 88. The valve 82 normally closes and seals the end of the vent conduit 80 as seen in FIG. 1.

To explain the operation of the siphon system illustrated in FIG. 1, it will be assumed initially that the system has just been installed and the collecting tank 10 and reservoir section 12 have no liquid therein. All of the floats will be in their lowermost position so that valve 32 will close tank outlet 16, valve 58 will close supply conduit 52, valve 82 will close vent conduit 80, and tank inlet 14 will be open along with the connection 54, all as shown in FIG. 1.

As a source (i.e., an air conditioner unit which generates condensate) begins to supply liquid to the system, this liquid will flow into the reservoir section 12 and into the tank 10 through the open inlet 14. As the liquid rises in the bottom of the tank 10 it will reach the level of the float element 34, generally designated as level "A," and will continue to rise without opening of the outlet 16 until the water level is sufficiently above the level "A" to impose an upward floating force on the float 34 to overcome the attraction of the magnets 48, 50 and thereby cause opening of the valve 32 and flow of liquid through the tank outlet 16 into the siphon discharge conduit 18, whereupon the level of the liquid in the siphon discharge conduit 18 will correspond to the liquid level in the tank 10. As the liquid level continues to rise in the tank 10, a level "B" will be reached at which the float 64 will be raised, opening the valve 58 so that pressurized liquid from supply conduit 52 will be admitted to the tank 10 causing a rather rapid further rise in the liquid level therein.

The liquid in the tank 10 and the siphon discharge conduit 18 will continue to rise to a level "C" at which the float 22 will be raised, operating the valve 20 to close the tank inlet 14, and thereby sealing the tank 10 above the level of the liquid, but with the tank outlet 16 remaining open. Further influx of the pressurized liquid from supply conduit 52 will establish a pressure head in the tank 10, with the pressure of the liquid from supply conduit 52 being sufficient to establish a pressure head of a magnitude that will raise the liquid to and through the uppermost part of the siphon discharge conduit 18 and establish a siphoning flow therein. It will be noted that after the tank inlet 14 is closed, the liquid level in the tank 10 will continue to rise until the trapped air in the upper portion of the tank 10 reaches a pressure corresponding to the pressure head needed to force the liquid through the siphon discharge conduit 18.

Once the siphoning flow is produced in the siphon discharge conduit 18 as described, the liquid level in the tank 10 will begin to fall, and the relatively large volume of the tank 10 in relation to the siphon discharge conduit 18 assures establishment of a positive siphon condition before the water level in the tank falls sufficiently to open the inlet 14. Even though the flow of pressurized fluid into the tank 10 from supply conduit 52 continues during initial siphoning, the flow regulating valve 56 is set to maintain the flow of the pressurized fluid into the tank 10 at a rate which is less than the rate of the siphoning flow produced in the siphon discharge conduit 18. It is within the scope of the present invention to provide any corresponding means for controlling or metering the flow of pressurized fluid to assure a lower flow rate in the supply conduit 52 than in the siphon discharge conduit 18.

It should be noted that level "B" is preferably located at a point intermediate levels "A" and "C" so that supply liquid will not be introduced into the tank during normal opening and closing of the outlet valve 32 when the siphon discharge conduit is primed, and so that the supply liquid will be introduced when the liquid level in the tank begins to rise substantially as a result of such prime being lost. However, level "B" could be located at any level which is lower than level "C" and, preferably, no lower than level "A."

As the siphoning action commences before the inlet 14 is opened, the upper portion of the tank remains sealed, and it is possible that under some conditions, such as when the inlet 14 has closed slowly or has allowed some leakage into the tank 10 before completely closing, there is an excessive amount of liquid in the tank 10, with the result that initial siphoning before opening of the inlet 14 will create a vacuum in the top of the tank 10 sufficient to prevent continued siphoning. Such a siphon disrupting vacuum is avoided by the vacuum breaking and pressure releasing vent conduit 80, which opens at its upper end to the atmosphere so that when a vacuum is created in the tank 10 atmospheric pressure will act through the vent conduit 80 against valve 82, overcoming the resistance of the weighted float 84, thereby opening the valve 82, which opens the top of the tank 10 to the atmosphere and breaks the vacuum in the tank so that siphoning can continue uninterrupted.

Continued discharge of the liquid through the siphon discharge conduit 18 will cause the liquid level in the tank 10 to fall beneath the level "C" whereupon the tank inlet valve 20 will be opened by the float element 22, allowing liquid to flow into the tank 10 from the reservoir section 12 through the inlet 14, which also vents the tank 10. As the liquid level continues to fall, the supply conduit valve 58 will be closed by the float element 64 when the liquid level falls below level "B," and the tank outlet valve 32 will be closed by the float element 34 as the level falls below level "A," with the magnets 48, 50 causing a snap-action closing.

When the level has fallen below level "A" to close the valve 32, it will be observed that since the siphon discharge conduit 18 is sealed, it will remain primed. As the normal influx of condensate liquid through the tank inlet 14 continues, the liquid level will eventually rise above level "A" again sufficiently to cause the aforementioned delayed opening of the tank outlet valve 32 and the accumulated liquid will flow through the already primed siphon discharge conduit 18 until the valve 32 is again closed. Thus, once the siphon system is initially primed in the aforementioned manner, further flow of condensate into the tank 10 will be automatically and periodically exhausted through the primed siphon discharge conduit 18, with the delayed opening caused by the magnets 48, 50 assuring sufficient liquid in the tank 10 for fairly rapid siphon flow.

The delayed action, rapid flow, caused by the magnets 48, 50 during the periodic opening and closing of the tank outlet valve 32 is significant as it has been found that entrained air in the siphon discharge conduit 18 tends to travel to the uppermost point thereof and also tends to accumulate to a much greater extent if the liquid flow through the siphon discharge conduit 18 is very slow. Accordingly, if the valve 32 is permitted to open and close slowly in response to the slowly changing liquid level in the tank 10 and without sufficient liquid in the tank to produce a rapid flow, the danger of siphon cavitation is increased; and by providing the magnets 48, 50 in accordance with the present invention, this adverse effect is eliminated since the valve 32 will open fully and quickly when the float element 34 acts to suddenly separate the magnets 48, 50 after sufficient volume of liquid has accumulated in the tank to cause a rapid siphon flow. Likewise the valve 32 will close fully and quickly when the magnet 48 is suddenly moved into contact with the bottom tank wall by the stationary magnet 50. Thus, accumulation of entrained air causing a loss of the siphon condition is substantially minimized.

Even under the best of operating conditions, however, cavitation and loss of prime within the siphon discharge conduit 18 may result from long periods of inaction and static water conditions within the siphon discharge conduit 18, or from other causes. If the prime in the siphon discharge conduit 18 is lost, the liquid in the tank 10 will not be periodically discharged therefrom and the level of the liquid will begin to rise and the siphon system will then automatically reprime in the manner previously described. Accordingly, the present invention provides a siphon system which normally operates to automatically and periodically discharge accumulated liquid in a collecting tank, while also providing for automatically priming and repriming the siphon system without the need of any pumping equipment or external power.

The siphon system of the present invention also includes several safety features to protect the system in the event of some malfunction. In this regard, the previously mentioned vacuum breaking and pressure releasing vent conduit 80, which is normally closed by the valve 82, will be opened should the liquid level in the tank 10 rise to an abnormally high level "D," at which the float element 84 will open the valve 82 and immediately release any pressure which has built up in the tank 10. It will be observed, of course, that the valve 82 and the float element 84 are located well above the liquid level which is realized in the tank 10 during the automatic priming operation previously described.

An additional safety feature is incorporated into the float element 68 and its associated valve 66 and cut-off switch 76. The float element 68 is located well above the tank inlet 14 and will not be brought into operation unless there is an abnormal rise in the liquid level in the reservoir section 12 as a result of some malfunction such as a failure of the valve 20 to open properly or an improper over filling of the tank 10. If the liquid level, for whatever cause, should rise in the reservoir section to a level "E," the float element 68 will move upwardly and close the valve 66 to stop any further flow of pressurized fluid into the tank 10 through supply conduit 52, and it will simultaneously actuate the cut-off switch 76 so as to shut down the air conditioner or other equipment which may be generating condensate or the like that is collected in the tank 10. In addition, the cut-off switch 76 may be connected in circuit with a visual and/or audible alarm (not shown) to energize the same when level "E" is reached.

Figure 2:
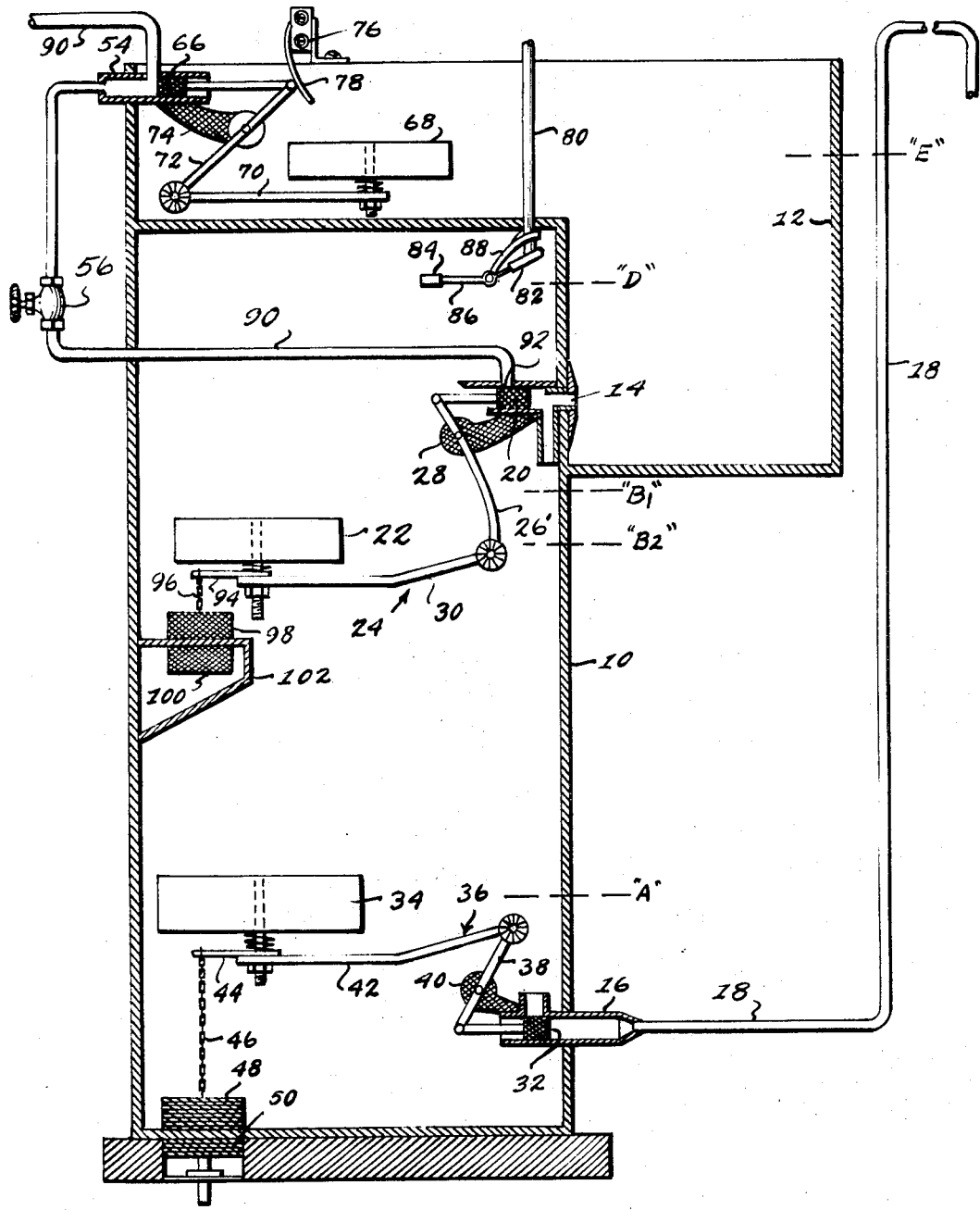
FIG. 2 is a diagrammatic illustration of another embodiment of the siphon system of the present invention.

In FIG. 2 there is shown another embodiment of the present invention that is designed principally for use with chemical liquids or the like which are not compatible with water. Chemical liquids could not be suitably handled by the system shown in FIG. 1 and described above since, it will be recalled, the pressurized liquid is preferably water taken directly from the water line at the location of the system, and this pressurized liquid flows into the collecting tank to mix with the collected liquid or condensate therein.

In the FIG. 2 embodiment, most of the elements are identical to the corresponding elements in FIG. 1 and they have been given the same identifying numerals with the understanding that those corresponding elements in FIGS. 1 and 2 having like numerals operate in the same manner as previously described in connection with the FIG. 1 embodiment. The FIG. 2 embodiment differs from the FIG. 1 embodiment in that the inlet control valve and the supply control valve are simultaneously operated by a common float that has a delayed action, and the pressurized fluid in the supply conduit is an inert gas rather than a liquid.

Thus, looking at FIG. 2, the supply conduit 90 extends from its origin at a source of pressurized inert gas, through the regulating valve 56, into the tank 10 at a location above the tank inlet 14, and opens at its end 92 into the inlet control valve 20 at a location where the inlet control valve closes the supply conduit end 92 when the inlet 14 is open and opens the supply conduit 90 to the tank 10 when the inlet 14 is closed. The inlet control valve 20 is operated by a linkage 24 identical to that of the embodiment of FIG. 1, but with the pivot link 26' extending downwardly farther than the pivot link 26 of the FIG. 1 embodiment for functioning of the float 22 to control the valve 20 at a lower level, and with means for delaying the action of the float 22 to effect closing of the inlet 14 by the valve 20 at a liquid level "B1" higher than the level "B2" at which the float 22 effects opening of the inlet 14. This delaying means is identical to the magnet arrangement described heretofore for effecting delayed operation of the outlet control float 34, having an arm 94 extending from the float 22 to which is connected a depending bead chain 96 with a permanent magnet 98 secured thereto for cooperation with a permanent magnet 100 mounted on a bracket 102 within the tank 10 below the float 22.

In operation of the FIG. 2 embodiment, liquid entering the inlet 14 will first rise above the level "A" to cause the float 34 to open the initially closed outlet 16. Continued flow of liquid into the tank 10 will cause the liquid level to rise in both the tank 10 and siphon discharge conduit 18 past the level "B2," at which the magnets 98 and 100 prevent valve operating movement of the inlet control float 22 until the liquid rises to the level "B1" at which the float 22 overcomes the attraction of the magnets 98, 100 and operates to manipulate the valve 20 to close the inlet 14 and simultaneously open the supply conduit 90 to supply pressurized inert gas to the tank 10. The pressurized gas causes a pressure head to develop in the tank 10 sufficient to force the liquid to the top of the siphon discharge conduit 18 and establish a siphoning condition that results in a rapid flow of liquid from the tank 10. This siphoning discharge results in a lowering of the liquid level in the tank 10, and when the liquid reaches the level "B2" the float 22 will cause the valve 20 to return to its original position in which the supply conduit 90 is closed at its end 92 and the tank inlet 14 is opened. Operation then continues in the same manner as in the FIG. 1 embodiment previously described, with repriming occurring by the operation just described whenever the siphon condition fails.

The volume of the tank 10 in relation to the volume of the siphon discharge conduit 18, the location of the float 22, and the attraction of the magnets 98, 100 are such that the difference between the inlet closing and supply conduit opening level "B1" and the inlet opening and supply conduit closing level "B2" provides sufficient volume of liquid to fill the siphon discharge conduit 18 with liquid and establish a siphoning condition before the liquid falls to the level "B2," thereby assuring full priming of the system before opening of the inlet 14.

It is also to be noted that the FIG. 2 embodiment could be used wherever the FIG. 1 embodiment could be used by simply connecting the supply conduit 90 to the aforementioned existing water line at the location of the installation. However, if water can be used as the pressurized fluid, the FIG. 1 embodiment is usually preferable because the pressurized water is admitted to the tank 10 when the liquid is at a much lower level (level "B" as opposed to level "B1") and, hence, the liquid level will rise much faster because of the added liquid, and the system will become primed sooner so as to reduce any tendency of cavitation in the static liquid in the siphon discharge conduit 18. Nevertheless, in situations where the condensate or other liquid collects rapidly in the tank 10, the FIG. 2 embodiment may be preferable even with water as the pressurized fluid since there is no danger of static cavitation and less supply water will be used to pressurize the tank 10 when priming is required.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A method of automatically priming a siphon system which includes a collecting tank having an upper inlet through which a liquid is admitted to said tank and having a lower outlet communicating with a siphon discharge conduit, said method comprising the steps of opening said outlet and closing said inlet in response to a predetermined rise in the level of said liquid in said tank whereby said tank is sealed above the level of said liquid, and then establishing a pressure head in said sealed tank of sufficient magnitude to discharge said liquid through said siphon conduit and produce a siphoning flow therein.

2. A method of automatically priming a siphon system as defined in claim 1 and further characterized in that said pressure head is established by introducing a gas into said sealed tank.

3. A method of automatically priming a siphon system as defined in claim 1 and further characterized in that said pressure head is established by introducing a second liquid into said sealed tank.

4. A method of automatically priming a siphon system as defined in claim 3, and further characterized in that the flow rate at which said second liquid is introduced into said tank is less than the flow rate of said siphoning flow produced in said siphon discharge conduit.

5. A method of automatically priming a siphon system as defined in claim 1 and characterized further by the step of reopening said inlet in response to a fall of the level of said liquid in said tank below a predetermined level as a result of said siphoning flow.

6. A method of automatically priming a siphon system as defined in claim 5 and characterized further by the step of venting said tank above said liquid after siphoning flow begins, thereby breaking any siphon flow resisting vacuum developing prior to said reopening of said inlet.

7. An automatically primed continuously operating siphon system including a collecting tank having an upper inlet through which a liquid is admitted to said tank and having a lower outlet communicating with a siphon discharge conduit leading therefrom, first control means for opening and closing said outlet in response to the rise and fall, respectively, of said liquid in said tank above and below a first predetermined level, second control means for closing and opening said inlet in response to the rise and fall, respectively, of said liquid in said tank above and below a second predetermined level higher than said first predetermined level, and means establishing a pressure head in said tank when said inlet is closed, said pressure head being of sufficient magnitude to cause said liquid to be discharged through said siphon discharge conduit and to produce a siphoning flow therein.

8. An automatically primed continuously operating siphon system as defined in claim 7 and further characterized in that said means for establishing said pressure head includes a conduit supplied with gas under pressure leading into said tank, and said second control means opens and closes said gas conduit in response to the rise and fall, respectively, of said liquid in said tank above and below said second predetermined level.

9. An automatically primed continuously operating siphon system as defined in claim 8 and further characterized in that said second control means opens and closes said gas conduit simultaneously with closing and opening, respectively, of said inlet.

10. An automatically primed continuously operating siphon system as defined in claim 7 and further characterized in that said means for establishing a pressure head includes a conduit supplied with a second liquid under pressure and leading into said tank, and a float operated valve arranged to open and close said conduit in response to the rise and fall, respectively, of said liquid in said tank above and below a third predetermined level which is no higher than said second predetermined level.

11. An automatically primed continuously operating siphon system as defined in claim 10 and further characterized in that said conduit supplied with said second liquid includes means for maintaining the flow of said second fluid into said tank at a rate lower than the flow rate of said siphoning flow produced in said siphon discharge conduit.

12. An automatically primed continuously operating siphon system as defined in claim 7 and further characterized by a vent conduit extending into the upper portion of said tank above said inlet, and a valve member biased to close said vent, said valve member operating in response to a vacuum condition in said tank to open said vent conduit and thereby break any vacuum in said tank during siphon flow prior to opening of said inlet.

13. An automatically primed continuously operating siphon system as defined in claim 12 and further characterized in that said vent valve member is weighted against atmospheric pressure in said vent conduit to maintain said valve member closed until a vacuum condition occurs in said tank sufficient to allow said atmospheric pressure to overcome said weighted valve member and thereby open said vent conduit to said tank for breaking of said vacuum condition.

14. An automatically primed continuously operating siphon system as defined in claim 13 and characterized further in that said vent valve member is also float operated by a rise in the liquid level in said tank after said pressure head has been established, thereby opening said vent valve member and allowing liquid to vent through said vent conduit.

15. An automatically primed continuously operating siphon system as defined in claim 7 and further characterized by vent conduit extending into the upper portion of said tank above the inlet thereof and having a valve member biased to close said vent conduit, and in that float means is associated with said vent valve member for opening the same and allowing liquid to vent through said vent conduit if the level of said liquid continues to rise in said tank after said pressure head has been established.

16. An automatically primed continuously operating siphon system as defined in claim 7 and further characterized in that said siphon system is associated with equipment generating the liquid which is collected in said tank, in that said tank includes a reservoir section located adjacent and above the upper portion of said tank with the lower part of said reservoir section communicating with said tank through said inlet thereof, and in that cut-off control means are provided in said reservoir section for stopping the operation of said equipment and for preventing further operation of said pressure head establishing means when the level of said liquid reaches a predetermined level in said reservoir section, said cut-off control means including a float element disposed in said reservoir section above said tank inlet.

* * * * *